United States Patent [19]

Berwick, Jr. et al.

[11] Patent Number: 4,684,085
[45] Date of Patent: Aug. 4, 1987

[54] AIRCRAFT AUTOMATIC TRIM SYSTEM

[75] Inventors: James W. Berwick, Jr., Seattle; Gary C. Thomason, Auburn, both of Wash.

[73] Assignee: The Boeing Company, Seattle, Wash.

[21] Appl. No.: 793,615

[22] Filed: Oct. 31, 1985

[51] Int. Cl.⁴ ............................................. G05D 1/10
[52] U.S. Cl. .................................. 244/178; 244/194; 318/584; 318/566
[58] Field of Search ................ 244/178, 194, 195, 89, 244/183; 318/580, 583, 584, 566, 591

[56] References Cited

U.S. PATENT DOCUMENTS

| Re. 24,273 | 2/1957 | Alderson | 318/580 |
| 3,079,109 | 2/1963 | Jude et al. | 244/183 |
| 3,378,217 | 4/1968 | Diani | 244/178 |
| 3,409,251 | 11/1968 | Lawson et al. | 244/178 |
| 3,578,268 | 5/1971 | Kramer | 244/178 |
| 4,032,093 | 6/1977 | Bonne et al. | 244/178 |
| 4,127,248 | 11/1978 | Boone | 318/584 |
| 4,382,282 | 5/1983 | Graham et al. | 244/178 |
| 4,442,490 | 4/1984 | Ross | 318/584 |

Primary Examiner—Jeffrey V. Nase
Assistant Examiner—Lynn M. Fiorito
Attorney, Agent, or Firm—James P. Hamley; B. A. Donahue

[57] ABSTRACT

An aircraft automatic trim system is operable during autopilot control to transfer trim from the elevators to the stabilizers. The thresholds for trim transfer are based on the ratio of elevator demand to available elevator control. Trim commands are produced responsive to this ratio exceeding an amplitude and time dependent limit.

10 Claims, 8 Drawing Figures

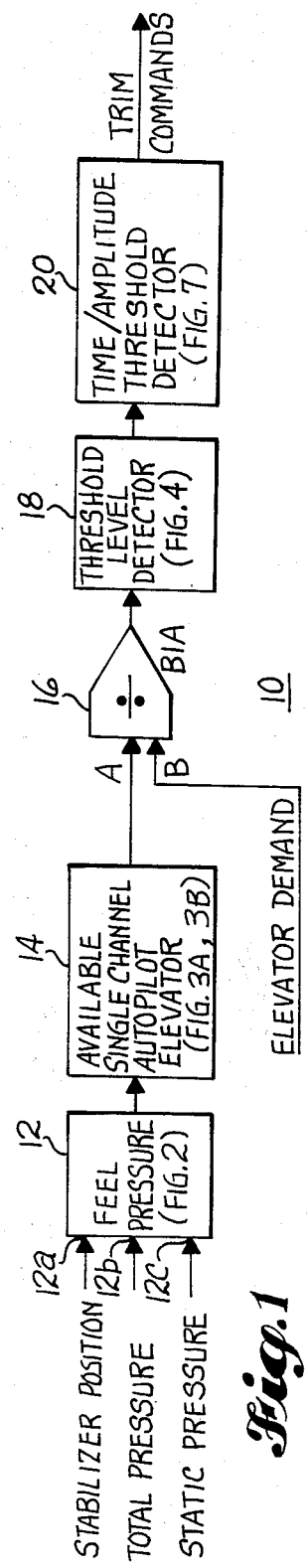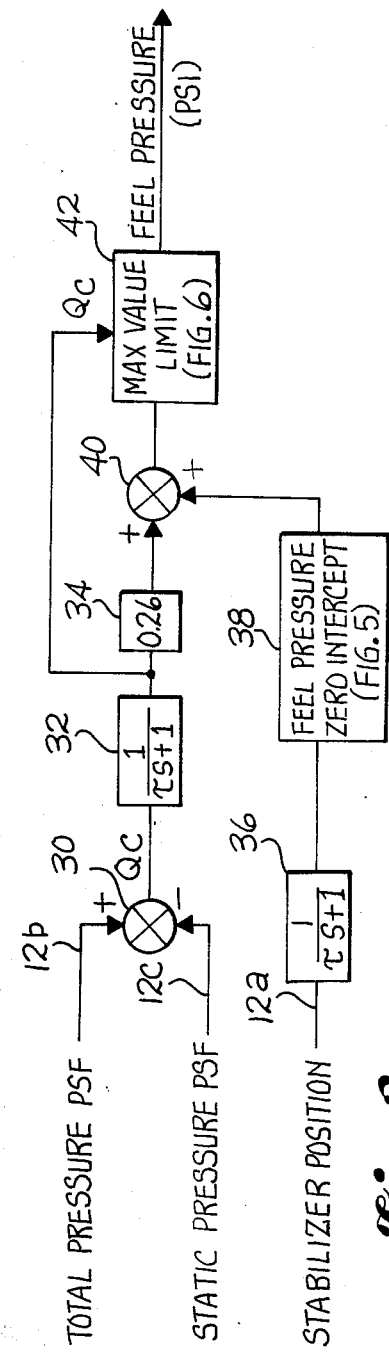

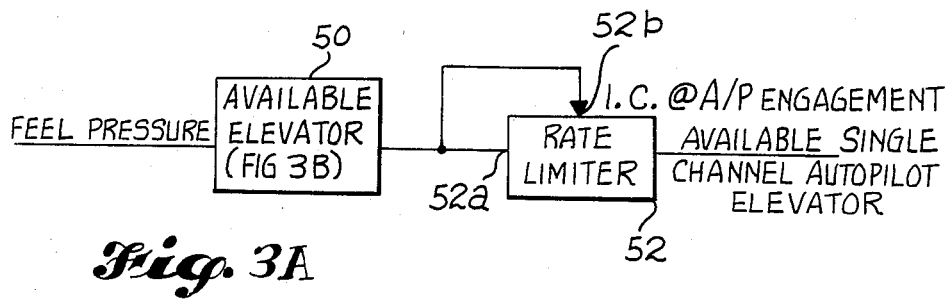
*Fig.* 3A
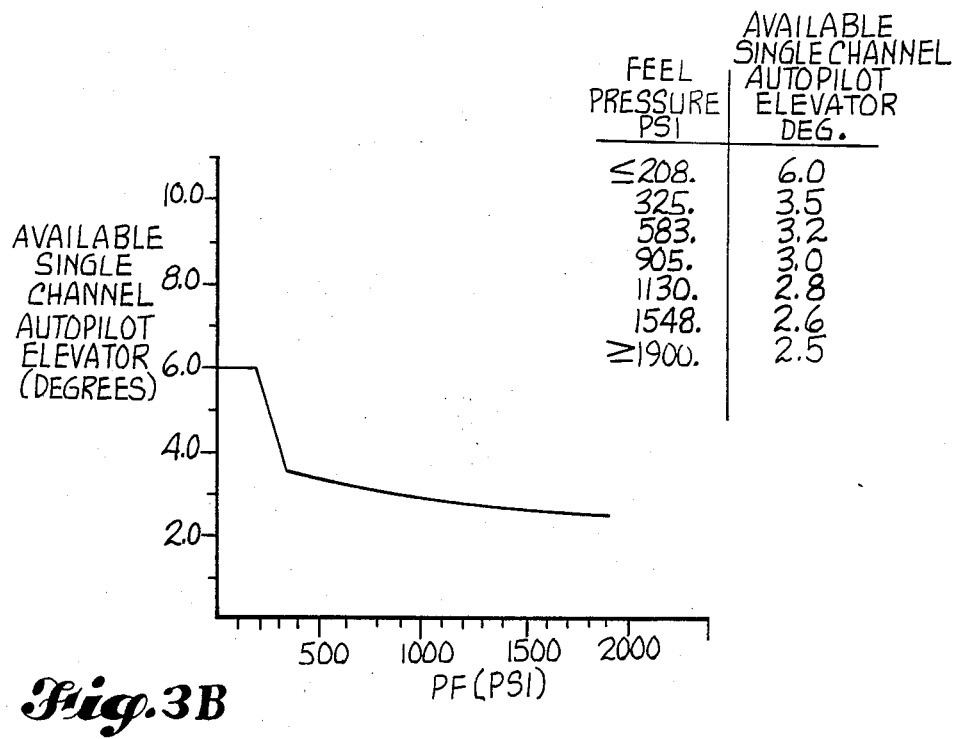
*Fig.* 3B

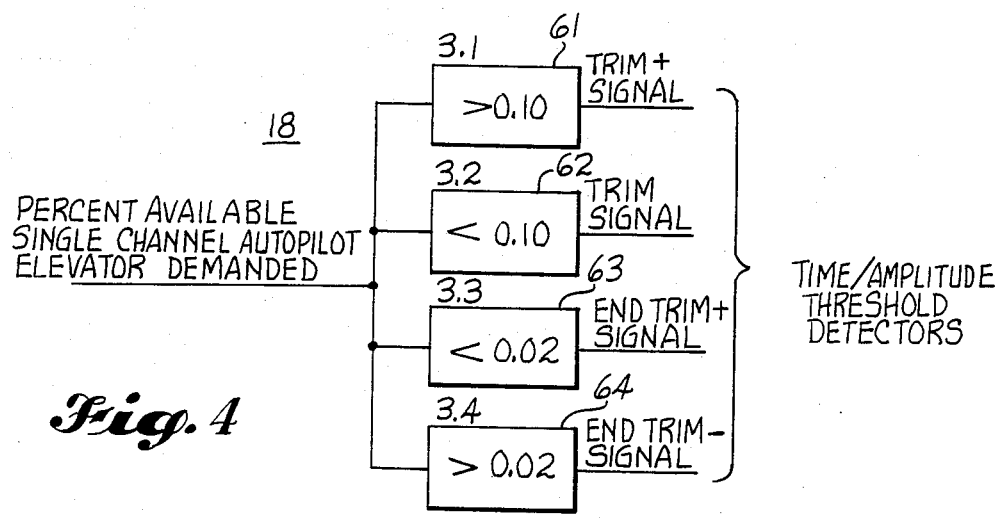
Fig. 4
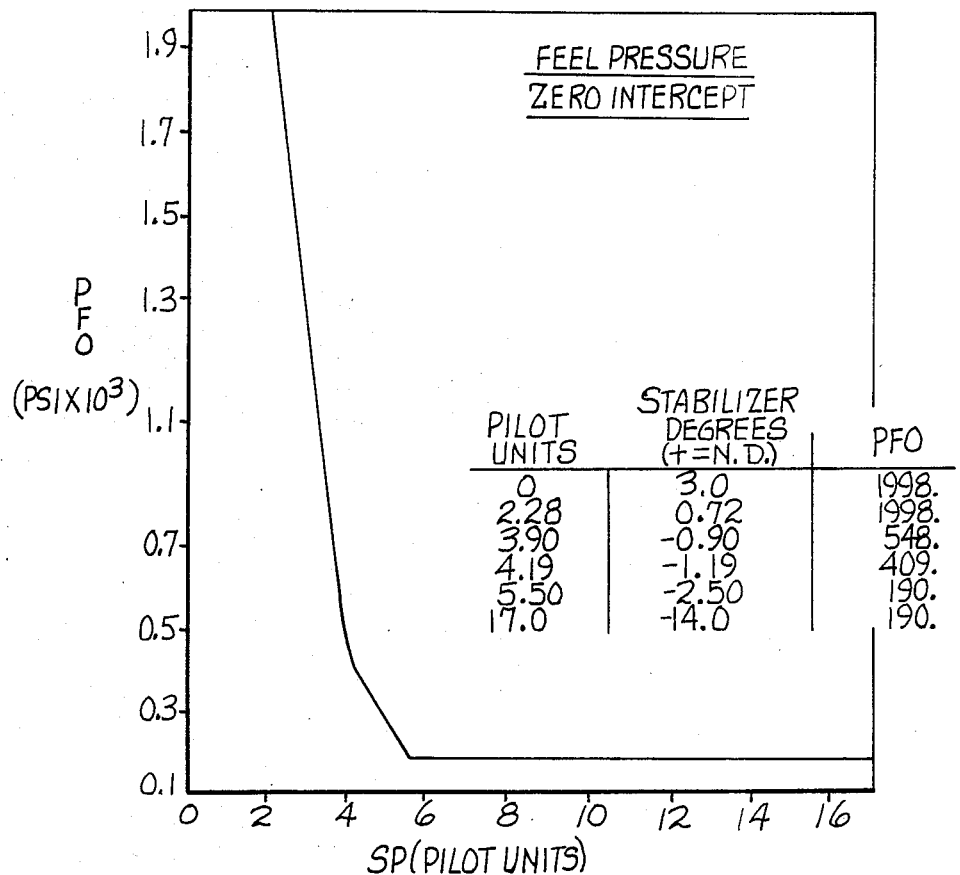
Fig. 5  NOTE: STAB(DEG) = −SP+3

AIRCRAFT AUTOMATIC TRIM SYSTEM

BACKGROUND OF THE INVENTION

The present invention pertains to the aircraft flight control art and, more particularly, to an automatic system for transferring aircraft trim control from the elevators to the stabilizers.

Most commercial transport aircraft in service today use the stabilizer to provide long-term or "trim" pitch control, with the elevator being used to provide short-term or maneuvering pitch control. Usually, the trim error is allowed to be held on the elevator until it is worthwhile transferring it to the stabilizer.

For single-channel autopilot elevator control, i.e., for cruise operation wherein only one of multiple autopilots is used to control flight, total control authority is typically limited to a maximum of "1g" maneuvering control in order to meet the Federal Aviation Requirements pertaining to hardover failure. This 1g authority is typically most restrictive (in terms of elevator travel) at the maximum dynamic pressure in the aircraft's flight envelope and drops off significantly at lower dynamic pressures. As a result, substantially reduced autopilot maneuvering authority is available in the portion of the flight regime wherein autopilot maneuver authority requirements, primarily due to engine thrust change for control, are largest (e.g., at low airspeeds).

A satisfactory autopilot trim system should transfer elevator "trim" to the stabilizer such that:

(1) Most of the autopilot elevator authority remains available for maneuvering, and
(2) The transient or "bump" which occurs when the autopilot disengages or is disengaged is maintained at a comfortable level.

In one automatic trim system known to the prior art, trim was transferred from the elevator to the stabilizer in response to the elevator being deflected beyond a threshold value for a fixed consecutive period of time, with a lower fixed value of elevator deflection used as the transfer cessation threshold.

A second prior art approach used stabilizer position to modify the previous valves of elevator used as the transfer threshold.

Both of these prior art trim systems produced nuisance stabilizer trim activity which is not only an annoyance to the flight crew, but also causes excessive wear to the stabilizer trim actuator. In addition, both of the prior art systems caused proper trim to be activated long after the trim requirement was created during certain flight conditions. In addition, both systems were known to produce annoying "bumps" when the autopilot was disengaged.

There is a long-felt need in this art, therefore, for an automatic trim system which does not suffer the disadvantages known to prior art systems.

SUMMARY OF THE INVENTION

The present invention, therefore, is directed to an automatic trim system which is capable of producing trim commands for transferring trim from the elevator to the stabilizer such that: (a) Most of the autopilot elevator authority remains available for maneuvering, (b) nuisance trim activity is avoided, and (c) the "bump" which is produced upon disengagement of the autopilot is minimized.

Briefly, according to the invention, an aircraft automatic trim system produces control signals to transfer trim from the aircaft's elevators to the stabilizers during an automatic aircraft control flight mode. The trim system includes an elevator control authority limit computation for producing a signal which represents the available elevator control in the automatic flight control mode. An elevator demand circuit produces a signal representative of actual elevator demand. A ratio signal is produced corresponding to the ratio of elevator demand to available elevator control. A detector produces the stabilizer trim command signals in response to the ratio signal.

In one aspect of the invention, the available elevator control signal is produced by feed pressure means which produces a signal representative of feel pressure on the aircraft's control column, and a converter for converting the feel pressure signal to a corresponding available elevator control signal.

A method for transferring trim control from an aircraft's elevators to its stabilizers during an automatic aircraft flight control mode, such as autopilot operation, is comprised of a first step of producing a signal representative of the available elevator control in the automatic flight control mode. Secondly, a signal is produced representative of actual elevator demand. A ratio signal is then produced corresponding to the ratio of the elevator demand signal to the available elevator control signal. The stabilizer trim command signals are produced responsive to the ratio signal.

In an aspect of this method, the signal representative of available elevator control is produced by first producing a signal representative of feel pressure on the aircraft's control column. The feel pressure is then converted to a corresponding available elevator control signal.

BRIEF DESCRIPTION OF THE DRAWINGS

FIG. 1 is a block diagram illustrating the overall method and apparatus of the inventive automatic trim system;

FIG. 2 is a block diagram illustrating the preferred method and apparatus for producing a signal representative of control column feel pressure;

FIG. 3A is a block diagram illustrating the preferred method and apparatus for converting a feel pressure signal to a corresponding available elevator signal;

FIG. 3B is a graph illustrating the relationship between feel pressure and available elevator;

FIG. 4 is a block diagram illustrating the level detectors used to produce trim and end-trim signals responsive to the percent available single-channel elevator demanded signal input;

FIG. 5 is a graph illustrating the manner by which the feel pressure zero intercept point is determined for use in the feel pressure system of FIG. 2;

DETAILED DESCRIPTION

Figure 6:
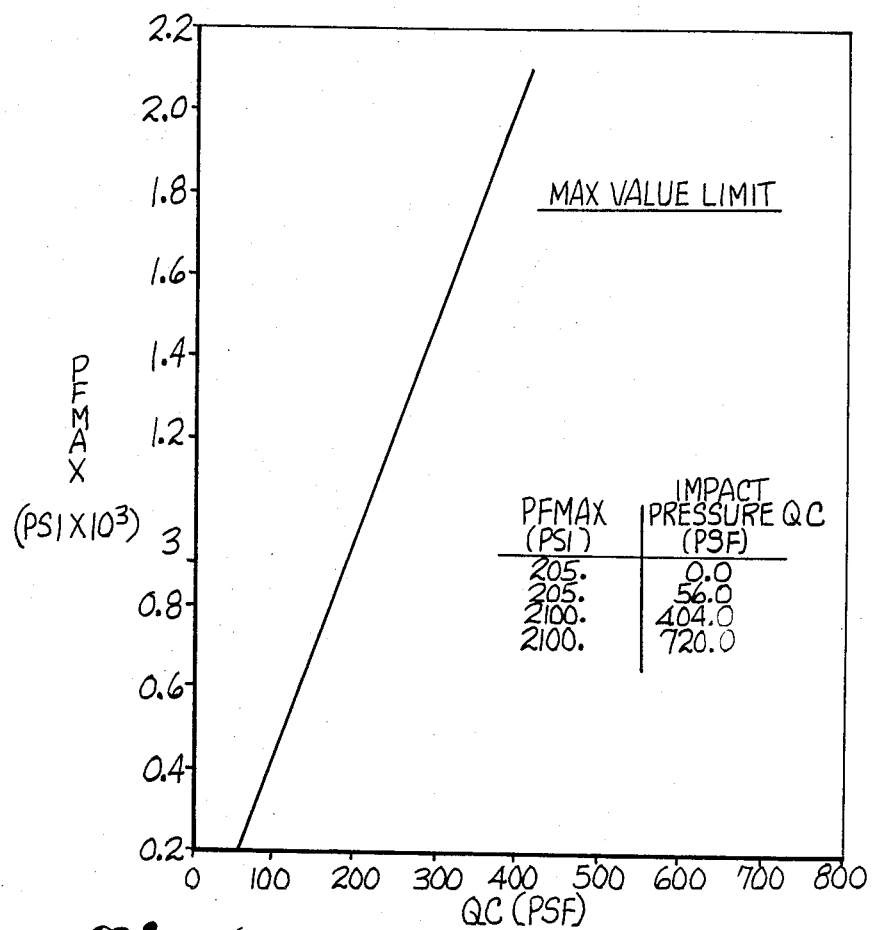
FIG. 6 is a graph illustrating the maximum value limit to feel pressure as used in the feel pressure signal generating system of FIG. 2.

FIG. 1 is an overall block diagram illustrating the principal components of the preferred embodiment of the automatic stabilizer trim system, indicated generally at 10. A feed pressure circuit 12 receives at its three inputs 12a–c signals representative of stabilizer position, total pressure and static pressure, respectively. The stabilizer position signal corresponds to deflection of the stablizer from a neutral position, and is commonly provided in later models of commercial transport aircraft. Total pressure and static pressure signals are also available on commercial aircraft.

The feel pressure circuit 12, which is described in detail with respect to FIG. 2, processes the three input signals at its inputs 12a–c and produces an output signal representative of feel pressure on the pilot's control column. This feel pressure signal is passed to the input of the available single-channel autopilot elevator circuit 14.

Modern commercial aircraft commonly carry multiple autopilot systems. During the cruise mode, only a single autopilot channel is used to control aircraft flight. By federal regulation, a single-channel autopilot is restricted to "1g" of maneuvering control authority. The maximum elevator effectiveness typically occurs at the maximum dynamic pressure in the aircraft's flight envelope (e.g., high airspeeds) and drops off significantly at lower dynamic pressures. As a result, the autopilot system suffers a substantially reduced maneuvering authority (due to the maximum autopilot elevator displacement) in the portion of the flight regime where autopilot maneuver authority requirements for control are largest (e.g., low airspeeds) primarily due to engine thrust change.

The available single-channel autopilot elevator circuit 14, in a manner described in detail with respect to FIGS. 3A, 3B, processes the input feel pressure signal from feel pressure circuit 12, producing an output signal representative of the total available single-channel autopilot elevator control authority.

The available single-channel autopilot elevator signal out of circuit 14 is passed to the A input of a divider 16. Passed to the B input of divider 16 is an elevator demand signal which represents elevator displacement from its neutral position.

The divider circuit 16 produces at its output a ratio of the signal at its B input to the signal at its A input. As such, the output from divider 16 is a signal representative of the percent available single-channel autopilot elevator demanded which is the percent maximum "g" command for high-speed flight and percent maximum pitch rate command for low-speed flight.

The ratio signal out of divider 16 is passed to the input of a threshold level detector circuit 18. The threshold level detector circuitry 18 is described in detail with respect to FIG. 4, but for present purposes it is sufficient to state that the threshold level detector 18 determines whether or not the ratio signal exceeds a first predetermined threshold level, corresponding to either a trim+ or trim− being produced or whether the ratio signal has fallen below a second predetermined threshold, corresponding to the production of end trim+ or end trim− signals. Thus, the function of threshold level detector 18 is to compare the input ratio signal to the first and second threshold levels, producing an appropriate output control signal in response thereto.

The output from the threshold level detector 18 is applied to the input of a time/amplitude threshold detector 20. The time/amplitude threshold detector 20, which is described in detail with respect to FIG. 7, receives the trim and end trim control signals from the threshold level detector 18 and determines whether or not these signals are present for a predetermined percentage of a predetermined time interval. If such trim signals are determined to be present for the required percentage of time in a given interval, the time/amplitude threshold detector 20 produces appropriate output trim commands which are used by the autopilot to transfer trim from the elevators to the stabilizers.

The overall aircraft automatic stabilizer trim system 10 as set forth in FIG. 1 is seen to incorporate trim thresholds based upon percent elevator demand with respect to available elevator control during an automatic mode of aircraft flight. The trim system 10 calculates the most desirable stabilizer trim thresholds which, for autopilot automatic stabilizer trim applications, minimizes nuisance automatic trim stabilizer trim and also minimizes elevator trim requirements for autopilot operation. In addition, the described trim system minimizes "bumps" which otherwise occur when the autopilot system is disengaged.

FIG. 2 is a detailed block diagram illustrating the preferred embodiment of the feel pressure circuit 12 shown in FIG. 1. Here, the total pressure signal on input 12b is applied to the positive input of a summer circuit 30. Applied to the negative input of summer circuit 30 is the static pressure signal applied at input 12c. The resultant signal out of summer circuit 30 represents dynamic pressure $Q_c$.

The dynamic pressure signal $Q_c$ is lag filtered in filter 32 to reduce system noise susceptibility. It is then converted from dynamic pressure in pounds per square feet to an intermediate feel pressure in pounds per square inch via multiplication by the constant 0.26 in multiplier 34.

The signal representing stabilizer position as input at 12a is lag filtered in filter 36 to reduce noise susceptibility and is then applied to a feel pressure zero intercept circuit 38.

The feel pressure zero intercept circuit 38 has a transfer characteristic in accordance with the graph of FIG. 5. The graph of FIG. 5 depicts the feel pressure zero intercept of the pilot's control column as a function of stabilizer position. The graph of FIG. 5 is determined by the feel system on a particular aircraft.

Returning to FIG. 2, a summer 40 sums the feel pressure zero intercept signal from circuit 38 with the intermediate feel pressure signal from multiplier 34. The output from summer 40 is a family of curves of the form:

$$P_F = 0.26 \times Q_c + f(STAB),$$

where
$P_F$ = feel pressure in psi
$Q_c$ = dynamic pressure in psf, and
f(STAB) = the zero intercept of feel pressure for various stabilizer settings The resultant family of curves out of summer 40 is then limited to a maximum value in the max value limit circuit 42. Also applied to the max value limit circuit 42 is the filtered dynamic pressure signal $Q_c$. The transfer characteristic of the max value limit circuit 42 is shown in the graph of FIG. 6, which plots maximum feel pressure vs. impact pressure $Q_c$. In most feel systems, the feel pressure which can be applied to the control column is limited to a predetermined maximum value. The graph of FIG. 6 illustrates this limit for various dynamic pressures.

Returning to FIG. 2, the output from the max value limit circuit 42 is, thus, the actual feel pressure in pounds per square inch.

As shown in FIG. 1, the feel pressure signal out of feel pressure circuit 12 is converted to an available single-channel autopilot elevator signal in circuit 14. FIGS. 3A and 3B depict the preferred manner for converting the feel pressure signal to the available single-channel autopilot elevator signal.

In FIG. 3A, the feel pressure signal, in pounds per square inch, is input to the available elevator circuit 50. FIG. 3B depicts the transfer characteristic of available elevator circuit 50. FIG. 3B is a graph showing the relationship of the available single-channel autopilot elevator (in degrees) vs. feel pressure (in pounds per square inch).

The graph in FIG. 3B is determined from the particular feel system for which the automatic trim system is to operate.

Referring again to FIG. 3A, the available elevator circuit 50 outputs the corresponding available single-channel autopilot elevator signal. The output from available elevator circuit 50 is applied to the two inputs 52a, 52b of the rate limiter 52. The rate limiter 52 is initialized to the existing available single-channel autopilot elevator value when the autopilot is engaged for use, via the input 52b. It then rate limits the available single-channel autopilot elevator to a predetermined rate (such as 0.5 degrees per second in one embodiment of the invention) to further reduce system noise susceptibility.

The output from the rate limiter 52 is a signal representative of the available single-channel autopilot elevator control. As described in FIG. 1, this signal is passed to the A input of a divider 16, which receives the elevator demand signal at its input B. The output of the divider 16 is, thus, the percent available single-channel autopilot elevator demanded.

The percent available single-channel autopilot elevator demanded is used to determine the stabilizer trim commands in the detectors 18, 20.

FIG. 4 is a block diagram depicting the threshold level detector 18. The level detector 18 is comprised of four comparator circuits 61–64. Each comparator circuit 61–64 compares the percent available single-channel autopilot elevator demanded input signal to its own internal reference level. Thus, when the percent elevator demanded exceeds 0.10, comparator 61 produces a trim+ signal. Similarly, if the percent elevator demanded is less than −0.10, a trim− signal is produced by comparator 62. Thus, comparators 61 and 62 determine whether or not the percent elevator demanded signal exceeds a first threshold level, namely 10% in either a positive or negative sense.

If the percent elevator demanded falls to less than 0.02, comparator 63 issues an end trim+ command. Correspondingly, if the percent elevator demanded signal falls to a level greater than −0.02, comparator 64 issues an end trim− command.

Thus, comparators 63, 64 compare the percent available elevator demanded signal to a second predetermined threshold level, namely 2%, producing corresponding end trim commands in response thereto.

Figure 7:
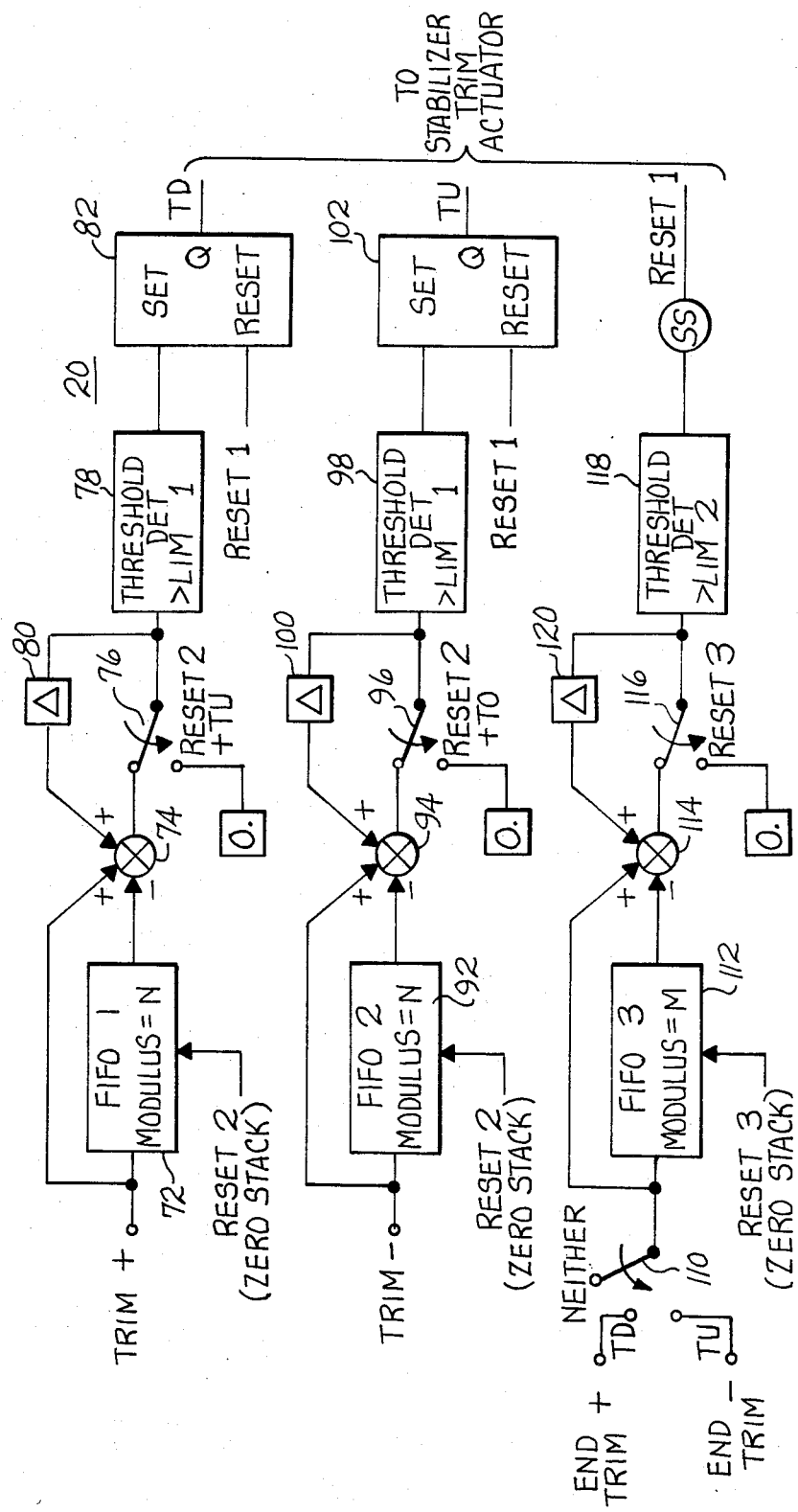
FIG. 7 is a block diagram illustrating the preferred embodiments of the time/amplitude threshold detectors used to produce the stabilizer trim actuator command signals.

The trim and end trim signals from the threshold level detector 18 are passed to the time/amplitude threshold detector 20, which is shown in detail with respect to FIG. 7. Here, the trim+ signal is applied to the input of a first in, first out modulus N memory (accumulator) 72. Also, the trim+ signal is applied to a positive input of a summer 74. The state of the modulus N memory 72 may be reset by a "reset 2" input. A reset 2 input is provided in the event that either the autopilot is shut off or a "reset 1" signal is produced, as described hereinbelow. The modulus N in one embodiment of the invention was selected as:

$$N = 5 \text{ sec/frame time for } \overline{A/P \ G/A} + A/P \ G/A \text{ plus 20 sec.}$$

$$= \frac{0.75 \text{ Sec./frame time for}}{\cdot A/P \ G/A \text{ plus 20 sec.}} A/P \ G/A$$

where A/P corresponds to autopilot activated and G/A corresponds to go-around mode.

The output from the summer 74 is the number of trimts out of N possible during the interval Nx frametime. This output is applied to a switch 76. Switch 76 in its normal position couples the output from summer 74 to the input of a threshold detector 78. However, in the event of a "reset 2" signal or a trim up command being produced (as described hereinbelow), switch 76 is activated thereby applying a zero level signal to the input of threshold detector 78. Also connected to the input of threshold detector 78 is a previous counter value 80. The output from the previous counter value 80 connects to a positive input of summer 74.

The threshold detector 78 determines whether or not it receives an input signal greater than LIM 1. In this, the preferred embodiment of the invention, $$LIM \ 1 = 3 \text{ sec/frame time for } \overline{A/P \ G/A} + A/P \ G/A \text{ plus 20 sec.}$$

$$= \frac{0.5 \text{ sec./frame time}}{\cdot A/P \ G/A \text{ plus 20 sec.}} \text{ for } A/P \ G/A$$

The output from threshold detector 78 is applied to the set input of a set/reset flip-flop 82. Flip-flop 82 produces at its Q output an appropriate trim down "TD" command signal, which may be used to control the trim actuator on the stabilizer in the event a trim-down is commanded. A "reset 1" signal which is generated from the end trim function to be described is applied to the reset input of flip-flop 82.

The trim− signal passes through circuitry which parallels that described above for the trim+ signal. Thus, the trim− signal is applied to the input of a modulus N first in, first out (FIFO) accumulator 92. Also, the trim− signal is passed to a positive input of a summer 94. The output from the modulus N accumulator is applied to a negative input of summer 94. The output from summer 94 passes through a switch 96 which normally connects the summer 94 to a threshold detector 98. In the event that a reset 2 or a trim-down command is generated, switch 96 is activated to a zero level signal.

Connected to the input of the threshold detector 98 is a previous counter value 100, whose output connects to a positive input of summer 94. The threshold detector determines whether an input signal is greater than LIM 1, in which event an output is passed to the set input of a set/reset flip-flop 102. At its Q output, the flip-flop 102 produces an appropriate trim-up "TU" signal, which may then be passed to the stabilizer trim actuator. Applied to the reset input of flip-flop 102 is a rest 1 signal which is generated from the end trim function to be described.

In operation, the above-described circuitry of FIG. 7 produces a trim-down or trim-up stabilizer trim actuator command signal in the event that trim error exceeds 10% of the single-channel autopilot authority for 75% of a 4.0 second interval except during during the period between 8 and 20 seconds after a dual-channel go-around, when it is reduced to a 0.75 second interval.

The end-trim+ and end-trim− signals are fed to the TD and TU inputs, respectively, of an input switch 110. When the system is in neither a trim-down nor a trim-up mode, the switch as in the "neither" position as shown. However, when in the trim-down mode, the end-trim+ signal is applied to the input of a modulus M FIFO accumulator 112. Correspondingly, the end-trim- signal is applied to the input of the modulus M FIFO accumulator 112 in the event that a trim-up command is generated. The modulus M FIFO memory 112 is reset to zero upon receipt of a "reset 3" input signal. A "reset 3" input signal is produced either as a result of the autopilot being disengaged or in the event that neither a trim-up nor a trim-down signal is being produced.

The remaining circuitry parallels that described above. Namely, the output from the modulus M FIFO memory 112 is applied to a minus input of a summer 114. Corespondingly, the input to the modulus M FIFO memory 112 is applied to a plus input of a summer 114. The output from the summer 114 is carried through a switch 116 which is normally closed, as shown, unless a reset 3 signal is received, in which case zero is passed through the switch 116.

The output from switch 116 connects to the input of a threshold detector 118 which detects the presence of signals at its input greater than a limit LIM 2. In this, the preferred embodiment of the invention, LIM 2=0.2 sec./frame time The input from the threshold detector 118 is also applied through a previous counter value memory 120 to a plus input of the summer 114.

The output from the threshold detector 118 corresponds to the "reset 1" signal. "Reset 1" is then passsed through a single shot (SS) which provides a short pulse to reset the set trim-up or trim-down flip-flop, the past value memories and the FIFO memories.

Thus, the operation of the third circuit branch of FIG. 7 creates a "reset 1" signal in the event that an end-trim command occurs for a predetermined percentage of a predetermined time interval.

In summary, an automatic trim stabilizer system has been described in detail. The system utilizes stabilizer trim threshold levels corresponding to a percentage of the available single-channel autopilot elevator demanded. In this way, the system transfers control from the elevators to the stabilizers at ideal thresholds, to thereby maximize elevator maneuvering authority. In addition, the threshold detection system employed minimizes, or eliminates spurious, nuisance trim commands. Finally, by appropriately transferring trim commands from the elevator to the stabilizer, the system eliminates, or greatly reduces the "bumps" which are otherwise experienced when the autopilot is deactivated.

While the preferred embodiment of the invention has been described in detail, it should be apparent that many modifications and variations thereto are possible, all of which fall within the true spirit and scope of the invention.

We claim:

1. An aircraft automatic trim system for producing control signals to transfer trim from the aircraft's elevators to the stabilizers during an automatic aircraft flight control mode, the system comprising:

available elevator control means for producing a signal representative of the available elevator control in said automatic flight control mode;

elevator demand means for producing a signal representative of actual elevator demand;

ratio means for producing a ratio signal representative of the ratio of said elevator demand signal to said available elevator control signal; and detector means for producing predetermined stabilizer trim command signals in response to said ratio signal.

2. The system of claim 1 wherein said available elevator control means comprises:

feel pressure means for producing a signal representative of feel pressure on the aircraft's control column; and means for converting said feel pressure signal to said available elevator control signal.

3. The system of claim 2 wherein said feel pressure means comprises:

means for producing a signal representative of aircraft total pressure;

means for producing a signal representative of aircraft static pressure;

means for combining said total pressure signal with said static pressure signal to produce a signal representative of aircraft dynamic pressure;

means for converting said aircraft dynamic pressure signal to an intermediate feel pressure signal;

means for producing a signal representative of stabilizer position;

means for producing a feel pressure zero intercept signal responsive to said stabilizer position signal; and means for combining said intermediate feel pressure signal with said feel pessure zero intercept signal to produce said feel pressure signal.

4. The system of any one of claims 1 through 3 wherein said detector means comprises:

a level detector for producing a trim signal in response to said ratio signal exceeding a predetermined first threshold and an end trim signal in response to said ratio signal falling below a predetermined second threshold; and a time amplitude detector for producing said predetermined trim command signals responsive to said level detector producing a trim signal for a predetermined portion of a predetermined time interval.

5. The system of claim 4 wherein said level detector comprises:

means for producing a trim+ signal responsive to said ratio signal exceeding said first threshold in a positive sense;

means for producing a trim− signal responsive to said ratio signal exceeding said first threshold in a negative sense;

means for producing an end trim+ signal responsive to said ratio signal falling below said second threshold in a positive sense; and means for producing an end trim+ signal responsive to said ratio signal falling below said second threshold in a negative sense.

6. A method for transferring trim control from an aircraft's elevators to the stabilizers during an automatic aircraft flight control mode, the method comprising the steps of:

(a) producing a signal representative of the available elevator control in said automatic flight control mode;

(b) producing a signal representative of actual elevator demand;

(c) producing a signal representative of the ratio of said elevator demand signal to said available elevator control signal; and (d) producing predetermined stabilizer trim command signals responsive to said ratio signal.

7. The method of claim 6 wherein step (a) comprises the steps of:

(i) producing a signal representative of feel pressure on the aircraft's control column; and (ii) converting said feel pressure signal to said available elevator control signal.

8. The method of claim 7 wherein step (i) comprises the steps of:

producing a signal representative of aircraft total pressure;

producing a signal representative of aircraft static pressure;

combining said total pressure signal with said static pressure signal to produce a signal representative of aircraft dynamic pressure;

converting said aircraft dynamic pressure signal to an intermediate feel pressure signal;

producing a signal representative of stabilizer position;

producing a feel pressure zero intercept signal responsive to said stabilizer position signal; and combining said intermediate feel pressure signal with said feel pressure intercept signal to produce said feel pressure signal.

9. The method of any one of claims 6 through 8 wherein step (d) comprises the steps of:

(i) producing a trim signal in response to said ratio signal exceeding a predetermined first threshold;

(ii) producing an end trim signal in response to said ratio signal falling below a predetermined second threshold; and (iii) producing said predetermined trim command signals responsive to said trim signal being produced for a predetermined portion of a predetermined time interval.

10. The method of claim 9 wherein:

step (i) comprises the steps of:

producing a trim+ signal responsive to said ratio signal exceeding said first threshold in a positive sense; and producing a trim− signal responsive to said ratio signal exceeding said first threshold in a negative sense; and step (ii) comprises the steps of:

producing an end trim+ signal responsive to said ratio signal falling below said second threshold in a positive sense; and producing an end trim− signal responsive to said ratio signal falling below said second threshold in a negative sense.

* * * * *